Patented May 13, 1941

2,242,079

UNITED STATES PATENT OFFICE 2,242,079

METHOD OF PREPARING 2-AMINO-PYRIMIDINE

Erwin Kuh, New Brunswick, and Martin Everett Hultquist, North Plainfield, N. J., assignors to American Cyanamid Company, New York, N. Y., a corporation of Maine No Drawing. Application December 17, 1940, Serial No. 370,482

16 Claims. (Cl. 260—251)

This invention relates to an improved process for reducing 2-amino-4-chloropyrimidine to produce 2-aminopyrimidine.

2-aminopyrimidine is used as an intermediate in the production of sulfanilamido pyrimidine which is of outstanding therapeutic importance. The production of the intermediate has, however, been very difficult in the past, involving a multi-step process in which a crude 2-amino-4-chloropyrimidine is obtained by a halogenation of a 2-amino-4-hydroxypyrimidine by means of phosphorus oxychloride or similar halogenating agents. This crude product cannot be satisfactorily reduced with hydrogen catalytically as it contains impurities which poison the catalyst and purification to a degree which permits catalytic reduction is economically unsatisfactory on a commercial scale.

Attempts to reduce the compound in neutral or acid solution with zinc dust have also been for the most part unsuccessful. In order to proceed at all, very dilute solutions have to be used and even in such a case the yields are poor.

The present invention depends on the reduction of 2-amino-4-chloropyrimidine by means of zinc dust in an alkaline solution. The reaction can be run in concentrated solution, the yields are good and the process is substantially insensitive to the presence of impurities in the 2-amino-4-chloropyrimidine which cause serious difficulties in the catalytic process. It is an advantage of the process of the present invention that it not only gives good yields and easy operating conditions, but the alkali to be used is not critical. We prefer to use either a caustic alkali such as sodium or potassium hydroxide or di- or trisodium phosphates. When the phosphates are employed all of the alkali may be added to the reaction at once. In the case of caustic alkalies, however, it is preferable, although not essential to add the caustic alkali gradually during the course of the reaction.

The process is not critical as far as temperature is concerned, but best results are obtained by carrying out the reaction at the boiling point of the solution. Operating at this temperature has the further advantage that the boiling of the solution acts as a thermostat and no critical adjustment of temperature is needed.

The zinc dust employed is preferably used in excess and the excess, together with the zinc oxide produced in the reaction, are readily filtered off and the pyrimidine can then be recovered from the clear solution by evaporation of the latter or by extraction with a suitable solvent such as hydrocarbon, ester, or alcohol which is relatively immiscible with the water solution.

The invention will be described in conjunction with the following specific examples which are typical illustrations but the invention is not limited to the exact details therein set forth. The parts are by weight except as noted.

Example 1

40 parts of anhydrous trisodium phosphate are dissolved in 250 parts of water. The solution is brought to the boil and 40 parts of zinc dust added. Thereupon a mixture of 20 parts of crude 2-amino-4-chloropyrimidine and 60 parts of zinc dust are introduced during a period of about 45 minutes with vigorous agitation. After all of the pyrimidine and zinc dust have been added, the mixture is boiled gently for about 1½ hours, cooled to 30° C. and the zinc and zinc oxide filtered off and washed with a little water. The filtrate is then made strongly alkaline with 60 parts of sodium hydroxide using cooling to prevent any rise in temperature. The 2-aminopyrimidine is precipitated and can be separated by extraction with hot benzene. On evaporation of the benzene solution, the product is obtained in the form of light yellow needles melting at 123–125° C. The yield is about 72%.

Example 2

55 parts of disodium phosphate are dissolved in 250 parts of water and brought to the boil. Thereupon 20 parts of zinc dust are added with vigorous agitation followed by a mixture of 30 parts of zinc dust and 10 parts of purified 2-amino-4-chloropyrimidine as fast as foaming will permit. After all of the amino-chloropyrimidine has been added the mixture is boiled gently for about three hours, cooled to 30° C. and the zinc and zinc oxide filtered off. The filtrate is then acidified to a pH of 4–5 and then evaporated down to about one-fifth its original volume. An equal volume of 50% sodium hydroxide solution is then added with cooling, and the precipitated 2-aminopyrimidine filtered. The filter cake and the filtrate are both extracted with hot benzene which is then evaporated to give a product in the form of light colored needles, the yield being about 82.5%.

Example 3

3.5 parts of sodium hydroxide are dissolved in 250 parts of water, brought to the boil, and then a mixture of 10 parts of crude 2-amino-4-chloropyrimidine and 80 parts of zinc dust added gradually. At the same time there is added a solution of 6½ parts of sodium hydroxide and 50 parts of water. The additions must be carried out very slowly (2-3 hours) because of foaming. The reaction mixture is strongly alkaline, the pH at all times being maintained at 12 or over. After all of the amino-chloropyrimidine has been added, the mixture is heated for two hours, then the zinc dust and zinc oxide is filtered off and the filtrate cooled. The 2-aminopyrimidine in the filtrate is then isolated by adding an equal volume of 50% sodium hydroxide with cooling. The 2-aminopyrimidine is dissolved by extraction with isopropylacetate and the aqueous layer is re-extracted twice with isopropyl acetate. The combined isopropylacetate extracts are treated with 36% hydrochloric acid to a pH of 3.5. The layer of 2-aminopyrimidine hydrochloride is separated and the 2-aminopyrimidine precipitated by addition of 50% sodium hydroxide to a pH of 8. It is filtered and dried. The mother liquor is re-extracted resulting in a small recovery. The yield is 57% of the theory.

We claim:

1. A method of reducing 2-amino-4-chloropyrimidine to 2-aminopyrimidine which comprises treating the material in aqueous dispersion with finely divided metallic zinc under alkaline conditions.

2. A method of obtaining 2-aminopyrimidine from 2-amino-4-chloropyrimidine which comprises subjecting the 2-amino-4-chloropyrimidine in aqueous dispersion to the action of finely divided metallic zinc in alkaline solution, filtering, making the filtrate sufficiently alkaline to precipitate 2-aminopyrimidine, dissolving the latter in a non-aqueous organic solvent and removing the solvent.

3. A method of reducing crude 2-amino-4-chloropyrimidine obtained from the halogenation of 2-amino-4-hydroxypyrimidine with phosphorus halogen compounds to 2-aminopyrimidine which comprises treating the material in aqueous dispersion with finely divided metallic zinc under alkaline conditions.

4. A method of obtaining 2-aminopyrimidine from crude 2-amino-4-chloropyrimidine obtained from the halogenation of 2-amino-4-hydroxypyrimidine with phosphorus halogen which comprises subjecting the 2-amino-4-chloropyrimidine in aqueous dispersion to the action of finely divided metallic zinc in alkaline solution, filtering, making the filtrate sufficiently alkaline to precipitate 2-aminopyrimidine, dissolving the latter in a non-aqueous organic solvent and removing the solvent.

5. A method of reducing 2-amino-4-chloropyrimidine to 2-aminopyrimidine which comprises treating the material in aqueous dispersion with finely divided metallic zinc in the presence of sufficient alkaline phosphates to produce alkaline conditions.

6. A method of obtaining 2-aminopyrimidine from 2-amino-4-chloropyrimidine which comprises subjecting the 2-amino-4-chloropyrimidine in aqueous dispersion to the action of finely divided metallic zinc in the presence of sufficient alkaline phosphates to produce alkaline conditions, filtering, making the filtrate sufficiently alkaline to precipitate 2-aminopyrimidine, dissolving the latter in a non-aqueous organic solvent and removing the solvent.

7. A method of reducing crude 2-amino-4-chloropyrimidine obtained from the halogenation of 2-amino-4-hydroxypyrimidine with phosphorus halogen compounds to 2-aminopyrimidine which comprises treating the material in aqueous dispersion with finely divided metallic zinc in the presence of sufficient alkaline phosphates to produce alkaline conditions.

8. A method of obtaining 2-aminopyrimidine from crude 2-amino-4-chloropyrimidine obtained from the halogenation of 2-amino-4-hydroxypyrimidine with phosphorus halogen compounds which comprises subjecting the 2-amino-4-chloropyrimidine in aqueous dispersion to the action of finely divided metallic zinc in the presence of sufficient alkaline phosphates to produce alkaline conditions, filtering, making the filtrate sufficiently alkaline to precipitate 2-aminopyrimidine, dissolving the latter in a non-aqueous organic solvent and removing the solvent.

9. A method according to claim 1 in which the reaction is carried out at approximately the boiling point of the solution.

10. A method according to claim 2 in which the reaction is carried out at approximately the boiling point of the solution.

11. A method according to claim 3 in which the reaction is carried out at approximately the boiling point of the solution.

12. A method according to claim 4 in which the reaction is carried out at approximately the boiling point of the solution.

13. A method according to claim 5 in which the reaction is carried out at approximately the boiling point of the solution.

14. A method according to claim 6 in which the reaction is carried out at approximately the boiling point of the solution.

15. A method according to claim 7 in which the reaction is carried out at approximately the boiling point of the solution.

16. A method according to claim 8 in which the reaction is carried out at approximately the boiling point of the solution.

ERWIN KUH.
MARTIN EVERETT HULTQUIST.